Feb. 17, 1970  F. J. FUCHS, JR  3,495,486
METHODS OF SIMULTANEOUSLY CUTTING PORTIONS OF A MEMBER
HAVING DIFFERING RESISTANCES TO CUTTING ACTION
Original Filed Nov. 9, 1965  4 Sheets-Sheet 1

FIG. 1

INVENTOR
F. J. FUCHS, JR.
BY Mann & Jangarathis
ATTORNEY

United States Patent Office 3,495,486
Patented Feb. 17, 1970

3,495,486
METHODS OF SIMULTANEOUSLY CUTTING PORTIONS OF A MEMBER HAVING DIFFERING RESISTANCES TO CUTTING ACTION
Francis Joseph Fuchs, Jr., Princeton Junction, N.J., assignor to Western Electric Company, Incorporated, New York, N.Y., a corporation of New York
Continuation of applications Ser. No. 506,983 and Ser. No. 507,074, both Nov. 9, 1965. This application June 9, 1967, Ser. No. 644,925
Int. Cl. B26d 5/08
U.S. Cl. 83—53
19 Claims

ABSTRACT OF THE DISCLOSURE

Methods of simultaneously cutting member portions wherein various portions offer differing resistances to hydraulic cutting action; for example, the corners and intermediate wall portions of a rectangular waveguide to be severed, or a plurality of holes of differing diameter to be cut in a member. The portions to be cut or severed are placed between a die cavity, or cavities, and a source of hydraulic pressure opposite the cavity, or cavities. The cavity, or cavities, have cross-sectional dimensions corresponding to the size and shape of the portions to be cut or severed. Increasing hydraulic pressure is applied to the portions to be cut or severed, and the portions are supported from within the die, cavity, or cavities, until the hydraulic pressure exerts sufficient pressure to insure that all portions are cut or severed, simultaneously. Also, methods of cutting or severing materials which increase in ductility when highly pressurized, and which additional methods employ the above-mentioned steps and the further step of subjecting such materials to hydraulic pressure pressurized sufficiently high to cause such materials to increase in ductility.

CROSS REFERENCE TO RELATED APPLICATIONS

This is a continuation of application, Ser. No. 507,074, filed Nov. 9, 1965, and application Ser. No. 506,938, filed Nov. 9, 1965, in the name of the same inventor and assigned to the same assignee, both of which applications are now abandoned.

BACKGROUND OF THE INVENTION

Field of the invention

This invention relates to methods of cutting normally rigid materials. More particularly, this invention relates to hydraulically assisted methods of cutting rigid materials wherein application of a pressurized fluid causes the materials to be sheared where unsupported, and also, to hydraulically assisted methods of simultaneously cutting a plurality of holes in a member, wherein the areas of the member to be removed exhibit different resistances to hydraulic cutting action.

While not limited thereto in its utility, this invention will be described in connection with the cutting of relatively thin-walled tubular members. It has been found that the improvements precipitated by this invention render it particularly suitable for use in the sectioning of rectangular wave guides, and for the cutting of various sized apertures in wave guide sections. As is well known, it is essential that there be no irregularities on the interior surfaces of a wave guide section.

Description of the prior art

When conventional shear type tools are employed for cutting wave guides or other tubular members, the inside surface of the wave guides are usually galled by the cutter. Further, a radius is formed on the outside of the cut and burrs are formed which project into the wave guides. Thus, before a wave guide section cut by prior art shear type tools can be used, it is necessary that the burrs be removed and the internal surfaces adjacent the cut be returned to their original state. To accomplish the foregoing, it is necessary that the wave guide be painstakingly worked manually with abrasive devices.

The galling and other disadvantages of the prior art mechanical shearing methods may be overcome by resort to properly performed hydraulic or perforating methods. When it is desired to cut a length of wave guide, a pressurized fluid can advantageously be employed as the cutting tool. However, for reasons to be outlined below, prior art hydraulic cutting methods are limited in their utility to the sectioning of circular wave guides or other circular tubular members of uniform wall thickness, grain structure; that is, to members having uniform resistance to shearing, and to that rare occasion when all of the holes to be produced are the same size, and the thickness and grain structure of the walls of the wave guide are perfectly uniform.

Considering first the cutting of rectangular wave guides into sections, the corners of relatively thin-walled rectangular or other irregularly shaped wave guides have greater mechanical strength than the walls in between the corners. Thus, the corners have a greater resistance to shearing forces than intermediate wall portions. Accordingly, a greater pressure is required to cut the corners of these irregularly shaped wave guides than is required to cut the wall portions intermediate the corners. The converse is true in the case of a circular wave guide, since there ordinarily are no portions about the circumference which exhibit greater resistance to shear than any other portion.

A circular wave guide normally has a uniform wall thickness and uniform resistance to shearing. In cutting such a circular wave guide, it can be expected that an interiorly applied, increasing hydraulic force will cause shearing to occur simultaneously about the entire circumference of the wave guide along a longitudinal line where there is no external support. However, if an increasing hydraulic force is applied interiorly of a rectangular wave guide, the portions of the wave guide between the corners shear first and pressure is lost. Also, upon shearing of the thinner intermediate wall portions, the working fluid rushes out, accumulates behind the corners of the rectangular wave guide, and exerts an opposing force which further inhibits cutting at the corners. As a result of the above-described loss of pressure and leakage behind the corners, prior art hydraulic cutting methods, when applied to wave guides having other than uniform resistance to shearing results in either a failure to shear the wave guides or in ragged edges.

The same results are obtained when one attempts to perforate or remove a piece from a body member, tubular or otherwise, which does not exhibit uniform resistance to shearing. Such non-uniform resistance to shearing may be caused by varying wall thickness, or differences in material properties such as grain structure. Further, if it is desired to cut two holes of different sizes by employing a pressurized fluid to cause shearing of the wave guide into two die cavities, the area opposite the larger die cavity will have a tendency to shear first. The fluid will then escape through the larger hole, resulting in a loss of pressure, and the smaller hole will not be cut. Further, even if the holes are of identical size, uneven cutting often occurs due to irregularities in the thickness or grain structure of the material to be cut. In such instances, the area to be removed may shear first on one side of the hole and thus be turned down in the form of a flap rather than being cleanly punched out by the pressurized fluid. The above considerations are compounded when it is desired to cut holes having different configurations as well as different sizes.

Generalizing this problem, the areas of material to be removed by action of the pressurized fluid may be viewed as offering different resistance to hydraulic cutting action. This invention is addressed to a solution to this general problem.

SUMMARY OF THE INVENTION

Accordingly, an object of this invention is to provide new and improved methods of cutting normally rigid materials.

Another object is to provide new and improved hydraulically assisted methods of cutting rigid materials wherein application of pressurized fluid causes the material to be sheared where unsupported.

Another object is to provide new and improved methods of cutting body members, which offer non-uniform resistance to shearing, with the aid of a pressurized fluid.

Another object is to provide new and improved methods of hydraulically serving tubular members having other than uniform resistance to shearing.

Another object is to provide new and improved hydraulically assisted methods of simultaneously producing a plurality of holes of different sizes in a member. A related object is to provide such methods for producing a plurality of holes having different configurations in addition to being of different sizes. Another related object is to provide such methods applied to producing holes in tubular members.

With these and other objects in mind, the invention contemplates methods wherein the portions of a body member to be severed are placed between the cavity of a female die and a source of hydraulic pressure opposite the cavity. The hydraulic pressure is increasingly applied to the portions of the member opposite the cavity. The portions of the member to be severed are supported from within the die cavity until the hydraulic pressure exerts sufficient force to insure that simultaneous shearing of all of the portions of the member to be severed occurs.

Further, the invention contemplates a method of simultaneously cutting a plurality of holes in a member in which the areas of the member exhibit differing resistances to hydraulic cutting action. The member is placed between a die having a plurality of cavities formed therein and a source of hydraulic pressure opposite the cavities. The cavities have cross-sectional dimensions corresponding to the size and shape of the areas to be cut from the member. The areas to be cut are supported from within the die cavities to equalize the resistances to hydraulic cutting action exhibited by the respective areas. Increasing hydraulic pressure is applied to the area of the member opposite the die cavities until the hydraulic pressure is sufficient to simultaneously overcome the equalized resistances to hydraulic cutting action, so that all of the areas are substantially simultaneously cut.

DESCRIPTION OF THE PREFERRED EMBODIMENTS

First embodiment

Figure 1:
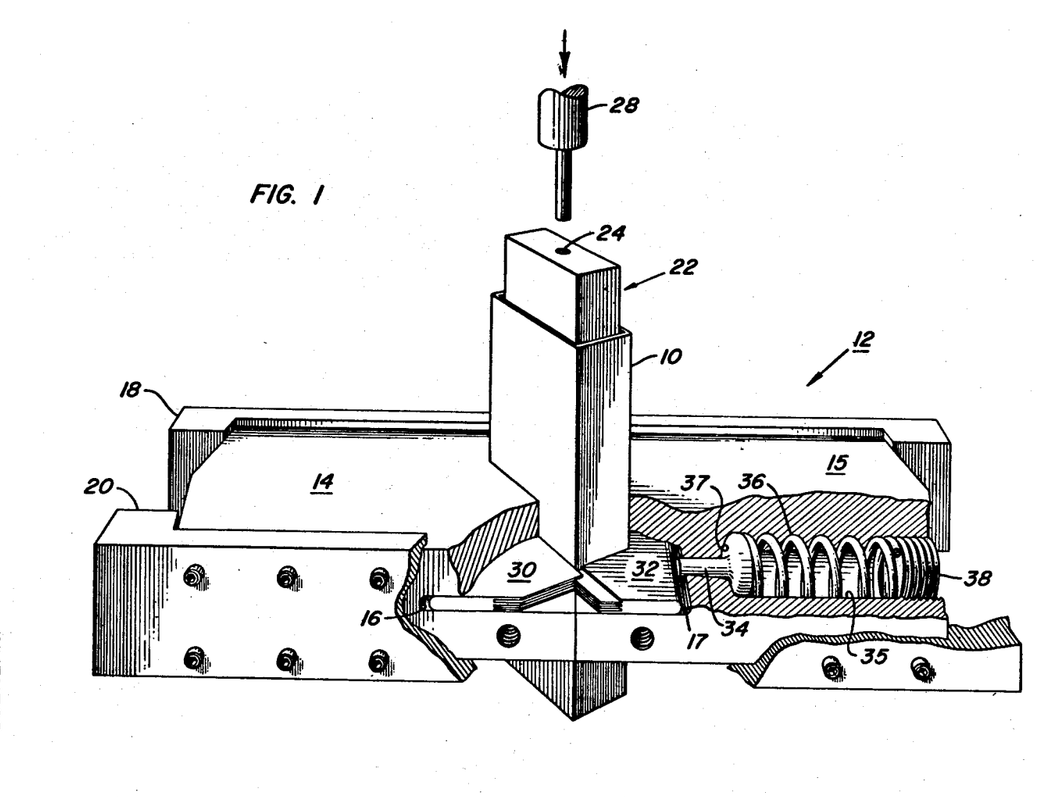
FIG. 1 is a partially sectioned view of an apparatus for hydraulically cutting rectangular-shaped tubular members in accordance with this invention.

Referring now to FIG. 1, a length of rectangular wave guide, which is to be cut into two sections, is designated by reference numeral 10. Wave guide 10 is inserted in a die structure, indicated generally by reference numeral 12, which comprises a pair of die blocks 14 and 15, respectively, having die cavities 16 and 17 therein. Cavities 16 and 17 define the size and shape of the material to be sheared or removed from wave guide 10 in making the cut. The facing ends of blocks 14 and 15 are machined so that they present a channel through which wave guide 10 can be inserted. The walls of blocks 14 and 15, which define this channel, support the outer walls of wave guide 10 at all points adjacent die cavities 16 and 17. Blocks 14 and 15 are restrained from movement and maintained in the proper position relative to each other by frame members 18 and 20.

Figure 2:
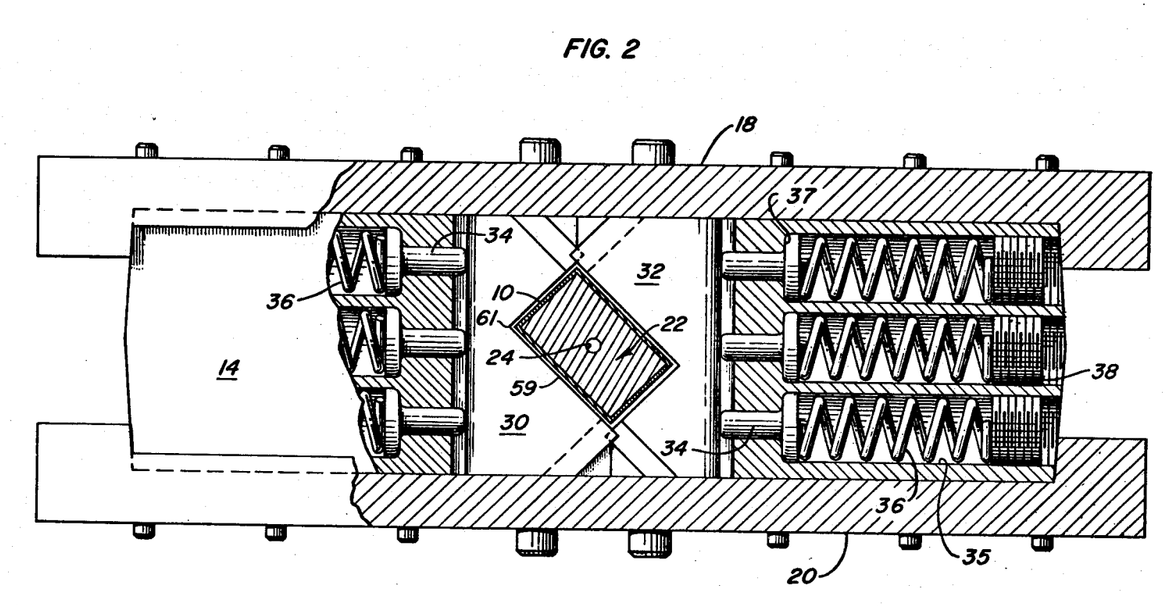
FIG. 2 is a top partially sectional view of the apparatus of FIG. 1 taken in the region where cutting will occur.
Figure 3:
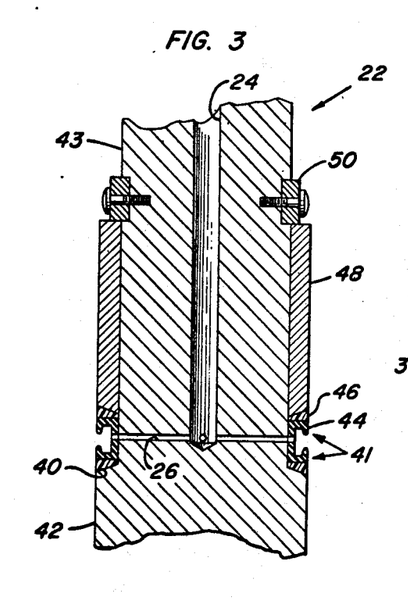
FIG. 3 is a sectional view of a mandrel for use with the apparatus of FIGS. 1 and 2.

As stated above, prior art hydraulic cutting methods could not be utilized to sever rectangular wave guides since the sides of the wave guides would shear prior to cutting of the corners. In order to overcome this deficiency, this invention employs means for supporting the wall portions to be removed until the proper cutting conditions are achieved. In the embodiment of FIGS. 1–3, the support means takes the form of blades 30 and 32. Blades 30 and 32 are located within cavities 16 and 17 in blocks 14 and 15, and are spring loaded. At opposite corners of wave guide 10, blades 30 and 32 mate in a tongue and groove arrangement which insures that there will be external support for the wave guide walls at the corners at all times. In a manner to be described below, blades 30 and 32 prevent premature cutting of wave guide 10 until a substantially incompressible working fluid, which may be silicone oil, confined within the wave guide has been sufficiently pressurized.

Blades 30 and 32 are loosely inserted within cavities 16 and 17 and are each urged toward wave guide 10 by piston members 34. Piston members 34 are disposed within cylinders 35 machined in blocks 14 and 15 on the same plane as, but radially displaced from, cavities 16 and 17. Piston members 34 have stop shoulders 37 thereon which limit their inward movement. The length of the smaller diameter portions of piston members 34 ahead of shoulders 37 is chosen such that there is initially a slight amount of clearance between blades 30 and 32 and wave guide 10. The clearance permits slight initial free outward movement of the wave guide walls, and thus minimizes the required amount of movement of blades 30 and 32. This initial free movement is insufficient to permit shearing. Piston members 34 are urged forward by springs 36. The tension on springs 36 is adjustable by means of rotating set screws 38 which threadably engage the inner walls of cylinders 35.

A mandrel 22 is inserted in wave guide 10 to support the wave guide from within at all points except where the cutting is to occur. As best seen from FIG. 3, mandrel 22 has a fluid supply passageway 24 therein. Passage 24 runs axially through mandrel 22 and terminates in a plurality of radially extending passageways 26. As will be explained in greater detail below, passageways 26 deliver the pressurized working fluid to the regions where cutting of wave guide 10 is desired. Pressurization of this fluid is achieved by advancing a ram or piston 28 (FIG. 1) into fluid supply passageway 24 after the latter has been filled with the working fluid.

Figure 4:
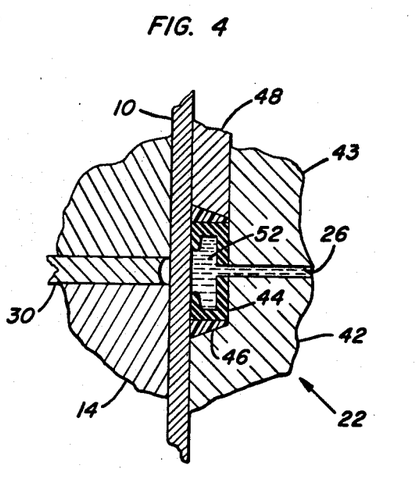
FIGS. 4, 5 and 6 depict various stages in the cutting of a wall of a tubular member in accordance with this invention and employing the apparatus of FIGS. 1 through 3.

In order to confine the working fluid in the desired cutting area, a pair of seals 41, each of which may be comprised of a nylon member 44 and a rubber portion 46, pass completely around the mandrel and, in cooperation with the wall of wave guide 10 being cut, define an annular chamber 52 (FIG. 4). The nylon members 44 define a plurality of openings which communicate with passageways 26 in mandrel 22. The working fluid is delivered to annular chamber 52 through passageways 26 and the openings in members 44. The seals are retained in position by a shoulder 40 which is formed by the larger diameter, lower portion 42 of mandrel 22, and by a steel sleeve 48 about the upper, smaller diameter portion 43 of the mandrel. Sleeve 48 is held in position by four independent keys 50. Removal of keys 50 and sleeve 48 permits replacement of the seals.

Figure 5:
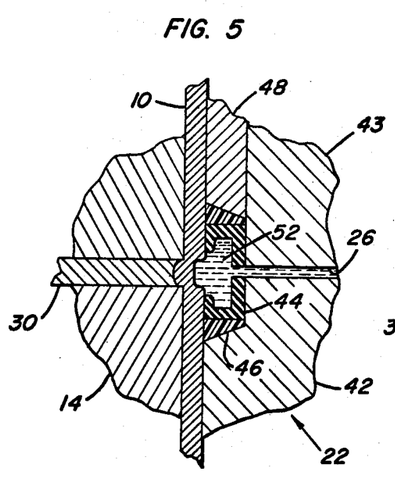
Figure 6:
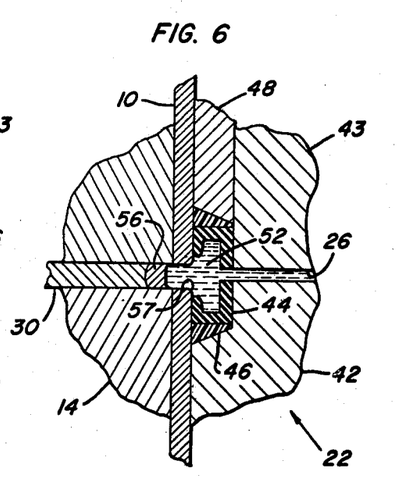

The process of cutting a rectangular shaped wave guide 10 in accordance with this invention can best be understood by reference to FIGS. 4–6. After mandrel 22 has been inserted in wave guide 10 (FIG. 2) and annular chamber 52 defined by seals 41 is positioned adjacent the area where the wave guide is to be severed, the wave guide-mandrel assembly is inserted in die 12. The area, where the cut is to be made, is then aligned with cavities 16 and 17. Next, the tension of springs 36 is adjusted by rotating set screws 38, thereby causing piston members 34 to urge blades 30 and 32 towards each other.

The tension on springs 36 is adjusted, from empirical data accumulated in prior tests, to the point where the resistance afforded by blades 30 and 32 will prevent cutting of any portions of the wave guide until the internal pressure is sufficiently high to insure simultaneous shearing of all such portions.

The above-mentioned data is preferably accumulated by sectioning a length of wave guide of a known material and wall thickness into a plurality of test specimens. The specimens are sequentially inserted into the apparatus of FIG. 1. For each such specimen, the tension on springs 36 is set at a different value than for the previous specimen and the apparatus is operated. This procedure is followed until a particular tension on springs 36 produces simultaneously cutting of all portions of the specimen to be severed. This data is recorded. The minimum tension on spring 36 at which all such portions of a specimen (of a particular wall thickness and material) are simultaneously severed is thus ascertained, and is known for other wave guides of the same material and wall thickness as the specimen. This procedure is repeated for the same material but differing wall thicknesses, and for different materials with different wall thicknesses. In this manner, calibrations are established of force necessary to insure simultaneous shearing versus wall thickness for particular materials.

For wave guides 10 comprised of copper, or other soft material, a relatively low pressure applied by the working fluid in general will produce simultaneous cutting; hence, the tension on springs 36 is adjusted relatively low in accordance with the empirical data. However, if the wave guide is comprised of molybdenum, or other hard material, the tension on springs 36 is adjusted relatively high in accordance with the previously accumulated empirical data. For either type of material, blades 30 and 32 are in this manner prevented from backing off until the working fluid is sufficiently pressurized to produce simultaneous cutting of all portions to be cut.

As is known from the work of Dr. Percy W. Bridgman, many materials when subjected to pressurized fluids exhibit an increase in ductility. If the hydrostatic pressure created within these materials by the action of the pressurized fluid is sufficiently high, plastic flow of the material results. For further detail of Dr. Bridgman's work, see his text entitled Large Plastic Flow and Fracture, published in 1952, McGraw-Hill Book Company.

When cutting wave guides 10, or other tubular members, comprised of copper or other soft material, it is not necessary that the working fluid be pressurized so high as to render the copper more ductile than it normally is, although this action would be an advantage. However, if wave guide 10 is comprised of molybdenum or other brittle material, the fluid should be pressurized sufficiently to render the molybdenum ductile to achieve proper cutting action without galling, burrs, or the like.

Next, the working fluid is pumped into passageway 24 until the passageway is substantially filled. Piston 28 is then advanced by conventional press means into passageway 24, thereby pressurizing the working fluid. As ram 28 continues to advance, the pressure transmitted by the working fluid to the walls of wave guide 10 causes hydrostatic pressure to build up in the walls. In the case of brittle materials, as this hydrostatic pressure builds up, the ductility of the wave guide 10 material subjected to the fluid increases. As noted above, for brittle materials, the brittle-to-ductile transition pressure for the material is ultimately exceeded.

As the pressure increases, the wave guide material begins to flow into die cavities 16 and 17. This initial distortion or flow is shown in FIG. 5. Spring loaded blades 30 and 32 prevent the material from shearing and flowing into die cavities 16 and 17 until a predetermined threshold pressure is built up within the fluid by the descent of ram 28. As noted above, this threshold pressure is adjusted by manipulation of screws 38 which regulate the spring tension applied to blades 30 and 32. In the case of wave guide 10, the threshold pressure will be adjusted so as to be larger than that known to be necessary to cause shearing of the material at the corners.

With the spring tension on blades 30 and 32 adjusted in accordance with the above considerations: the force supporting a wall of wave guide 10 at a point 59 (FIG. 2) is relatively at least as great as the difference between the force necessary to shear a corner 61 and the wall at point 59. The wall of wave guide 10 at a point 59 exhibits the least resistance to hydraulic cutting action and should be supported with the above-described supporting force to insure simultaneous cutting of all portions to be cut of wave guide 10. Under these conditions, the supporting force on corner 61 may be relatively zero with respect to the supporting force on the wall at point 59 of wave guide 10; that is corner 61 may theoretically be supported with no force while the wall at point 59 is supported with the above-described minimum supporting force.

As may be seen from FIG. 6, when the applied hydrostatic pressure exceeds this threshold value, a force will be transmitted by the material to be removed to blades 30 and 32. This force, being sufficient to overcome the spring tension, will cause the blades 30 and 32 to retract and scrap pieces 56 from the wave guide walls will shear into die cavities 16 and 17. This shearing will occur simultaneously about the entire circumference of wave guide 10. Thus, there will be no premature bleeding off of the pressurized fluid nor will fluid leak out around the wave guide and exert pressure on the outer surfaces of the wave guide at the corners. Due to the increase in ductility (in the case of brittle materials) caused by the build up of hydrostatic pressure within the portion of wave guide 10 exposed to the pressurized fluid, the edges of the cut will have a radius 57 and there will be no internal burrs. Also, the cutting will occur relatively slowly and thus the tool will not be subject to mechanical shocks.

While the foregoing illustrative embodiments have been shown and described, various modifications and substitutions may be made without deviating from the spirit and scope of this invention. For example, while the blades 30 and 32 have been shown as being spring loaded, they could equally well be hydraulically actuated. Also, while die 12 has been shown as external to wave guide 10, it could be built into mandrel 22 and the assembly then inserted into a pressure vessel. In this manner, the scrap resulting from the cutting operation would be injected into the wave guide, and thus removed from the apparatus therewith. Further, while severing of a tubular member has been discussed, the principles of this invention may be used to sever or to cut an opening in a tubular member, a piece of flat or corrugated stock, or the like.

Stated in another way, the principles of the invention may be applied to cutting members exhibiting non-uniform resistance to shearing.

Second embodiment

Figure 7:
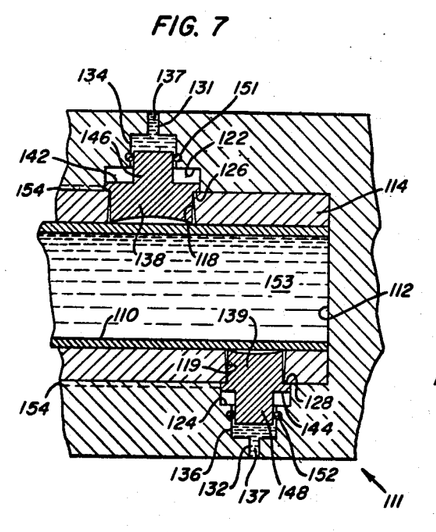
FIGS. 7 and 8 are partially sectioned schematic views of a tubular member being simultaneously cut at a plurality of points, in accordance with one method illustrating the principles of this invention.
Figure 8:
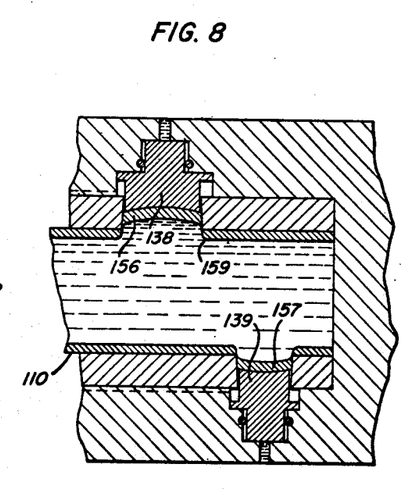

Referring now to FIGS. 7 and 8, there is schematically shown an apparatus which is capable of simultaneously cutting a plurality of holes in a tubular member 110, illustratively a section of rectangular wave guide tubing, according to the principles of the method of this invention. The cutting is to be performed from the inside of member 110 toward the outside of it. The apparatus comprises a die block, indicated generally by reference numeral 111, having a blind hole 112 formed therein. A sleeve 114 fits tightly within hole 112 and determines the size and shape of the opening for receiving tubular member 110.

Sleeve 114 also has formed therein a pair of die cavities 118 and 119. Proceeding outwardly from tubular member 110, cavities 118 and 119 have inwardly tapering walls. Cavities 118 and 119 communicate, respectively, with recesses 122 and 124 machined in the face of the inner wall of die block 111. Recesses 122 and 124 are larger in cross-sectional area than the cross-sectional area of the ends of cavities 118 and 119 which communicate therewith; thus, sleeve 114 forms stop shoulders 126 and 128 located, respectively, at the bottom of cavities 118 and 119.

Recesses 122 and 124, respectively, communicate with passageways 131 and 132 via cylinders 134 and 136. Cylinders 134 and 136, and passageways 131 and 132, are machined in die block 111 at the time of the forming of recesses 122 and 124. The outer ends of passageways 131 and 132 are connected, by suitable hydraulic fittings, to a source (not shown) of pressurized, substantially incompressible fluid 137, such as silicone oil. Passageways 131 and 132 may, in the alternative, be connected to individual sources of fluid.

A pair of radially movable support members or plugs 138 and 139, respectively, are disposed in cavities 118 and 119. Since, in this illustrative example, the holes to be formed in member 110 are of circular shape, plugs 138 and 139 are of circular shape and are slightly smaller in diameter than the diameter of cavities 118 and 119, respectively. The cutting action to be described below is facilitated by forming the face of plugs 138 and 139 so that they present concave surfaces to the walls of member 110. These concave surfaces create tensile forces at the lips of plugs 138 and 139, and therefore enable shearing at lower pressures than might otherwise be required.

Plugs 138 and 139 are formed with respective flanges 142 and 144 thereon. These flanges limit inward motion of plugs 138 and 139 by butting against stop shoulders 126 and 128, respectively. Flanges 142 and 144 also limit the outward movement of plugs 138 and 139 by bottoming in recesses 122 and 124. The outer ends of plugs 138 and 139 comprise pistons 146 and 148 which, respectively, extend into cylinders 134 and 136. The movement of plugs 138 and 139 is controlled in response to pressurized working fluid 137 supplied to cylinders 134 and 136 from the source of fluid.

Conventional seals 151 and 152, such as O-rings, are respectively disposed between the walls of cylinders 134 and 136 and their respective pistons 146 and 148. Seals 151 and 152 prevent leakage of working fluid 137 from cylinders 134 and 136 into recesses 122 and 124. If fluid 137 were to leak into recesses 122 and 124, with plugs 138 and 139 in the position shown in FIG. 7, cutting of member 10 would be impossible since outward motion of plugs 138 and 139 would be prevented by the incompressible fluid.

A plurality of grooves 154 are machined in the inner wall of die block 111. These grooves connect die cavities 117 and 118 with a sump, not shown, located outside of the apparatus. Grooves 154 are provided to bleed off any working fluid 137 which leaks from inside member 110 around the ends of member 110 at the bottom of blind hole 112, such fluid flowing between member 110 and sleeve 114 would otherwise tend to accumulate in die cavities 118 and 119.

In this second illustrative method of practicing the invention, assume that the holes to be cut opposite plugs 138 and 139 are different sizes (and therefore exhibit different resistances to hydraulic cutting action), that pistons 146 and 148 are of equal cross-sectional area, and that pressurized fluid 137 is supplied from separate fluid supply sources to passageways 131 and 132. Under these conditions, the area to be cut of member 110 opposite the larger plug 138 has less resistance to hydraulic cutting action than the area to be cut opposite the smaller plug 139, when fluid 153 is pressurized. Therefore, to insure simultaneous cutting of both holes, the area opposite die cavity 118 is supported from within the cavity with a greater backup force than the area opposite die cavity 119. Restated, the backup force from within a cavity on the particular area to be cut is inversely related to the resistance to hydraulic cutting action of that area. Locked at from another viewpoint, the backup force on the area to be cut out is directly related to the cross-sectional area of the particular area. Viewed in still another way, different backup forces are applied to the respective areas exhibiting different resistances to hydraulic cutting action, so that the resistances offered by the various areas to hydraulic cutting action are equalized.

The apparatus shown in FIG. 7 is assembled by first inserting plugs 138 and 139 into recesses 122 and 124 in die block 111. Next, sleeve 114, which may be in two pieces to facilitate assembly, is inserted in blind hole 112 in die block 111. Member 110, in which holes are to be cut, is then placed in the opening defined by sleeve 114, such that die cavities 118 and 119 are aligned with the areas of member 110 where the holes are to be cut out.

Member 110 is filled with working fluid 153, which like fluid 137, may be a substantially incompressible fluid such as silicone oil. Passageways 131 and 132 are connected to their respective sources of pressurized fluid 137, so that plugs 138 and 139 are urged forward to the point where their motion is stopped by shoulders 126 and 128 (FIG. 1). The respective backup pressure applied by pressurized fluid 137 to pistons 146 and 148 creates backup forces which are applied by plugs 138 and 139 to the areas of member 110 opposite the respective plugs.

The backup pressures applied by fluid 137 to the resective pistons 146 and 148 are chosen from previously compiled test data. These backup pressures are sufficiently high to prevent outward movement of plugs 138 and 139, until the pressure applied by fluid 153 is sufficiently increased to create forces which are sufficient simultaneously to overcome the resistances to hydraulic cutting action offered by the respective areas and the respective backup forces. In this manner, all of the areas opposite plugs 138 and 139 are simultaneously cut into the die cavities 118 and 119.

The above-mentioned test data is compiled by cutting a member of known material and wall thickness into a plurality of test specimens. The specimens are sequentially inserted into the apparatus of FIG. 7. For each such specimen the backup pressure on piston 148 (opposite the smaller hole area) is kept constant; the internal pressure on fluid 153 is increased through a predetermined range of pressures; and the backup pressure on piston 146 is increased from that pressure on piston 146 for the previous specimen. This step-by-step procedure of increasing the backup pressure on piston 146 is continued until both of the areas opposite plugs 138 and 139 are substantially simultaneously cut into the cavities 118 and 119. This data is recorded. When it is desired in production to cut the same sized holes in a member 110 of the same material and wall thickness as the above-described specimens, the backup pressures applied by fluid 137 to pistons 146 and 148 are adjusted to be the same as that determined to cause simultaneous cutting of all of the holes when the test data was compiled.

Thereafter, the procedure of compiling test data, described above, is repeated with different hole sizes. A calibration curve is constructed relating backup pressure on the pistons (and hence backup force on the areas to be cut out) to varying wall thickness for members of a particular wall thickness and various combinations of hole sizes. Thereafter, different calibration curves can be constructed by the above-described procedure by changing the holes sizes, or the materials.

Alternatively, fluid 137 can be supplied from a single supply source. In this situation, the cross-sectional areas of pistons 146 and 148 are different (as opposed to equal cross-sectional areas as described above). Pistons 146 and 148 are of different cross-sectional area when a single fluid supply source is used, in order to achieve the proper backup forces on the areas of member 110 supported from within die cavities 118 and 119, as described supra.

To recapitulate, the areas to be cut offer different resistances to hydraulic cutting action, by reason of the areas being of different cross-sectional areas, non-uniform grain structure, and the like. Consequently, these areas offer different resistances to hydraulic cutting action with respect to each other. To insure that all of the areas are cut simultaneously, the areas are supported with forces which insure that all of the areas offer equal resistance to hydraulic cutting action. Thus, when internal fluid 153 is sufficiently pressurized, all of these equalized resistances are simultaneously overcome, and all of the areas are simultaneously cut into the die cavities.

The walls of member 110 can bulge, or expand only at die cavities 118 and 119. Thus, there is no unwanted distortion of member 110. Pressurization of fluid 153 within member 110 causes forces to be transmitted by the fluid to the walls of member 110. For members 110 of copper, or other soft material, a relatively low pressure applied by working fluid 153 in general will produce simultaneous cutting; hence the backup pressure by fluid 137 is adjusted to be relatively low in accordance with the previously compiled test data. However, if the member is comprised of molybdenum, or other brittle material, backup pressure on the respective pistons is adjusted to be relatively high in accordance with the previously compiled test data. For either type of material, plugs 138 and 139 are prevented from backing off until work fluid 153 is sufficiently pressurized to produce simultaneous cutting of all of the holes. This insures that cutting occurs about the entire perimeter of each hole, thereby obviating the problem of partial cutting or leaving of a flap.

When cutting members 110 comprised of copper or other soft material, it is not necessary that the working fluid be pressurized so high as to render the copper more ductile than it normally is, although this action would be an advantage. However, if members 110 are comprised of molybdenum, or other brittle material, the fluid should be pressurized sufficiently to render the molybdenum ductile to achieve cutting action without galling, burrs, or the like.

FIG. 8 depicts the results of the cutting performed in accordance with this invention, wherein the buildup of pressure by fluid 153 within member 110 was continued until a pressure greater than that necessary to cause shearing at all points was achieved. Restated, the respective backup pressures applied by fluid 137 to pistons 146 and 148 were maintained at preselected values and the internal pressure applied by fluid 153 to member 110 was increased until cutting of all areas occurred simultaneously. In this manner, "slow" cutting is achieved and the possibility of tool damage due to mechanical shocks is eliminated. "Slow" cutting is also deemed desirable because of its controllability.

When the internal pressure within member 110 becomes sufficiently higher than the equal resistance to hydraulic cutting offered by the areas to be cut, after the appropriate backup forces have been applied, the holes corresponding in size and shape to cavities 118 and 119 are simultaneously cut. Plugs 138 and 139 are driven by the pressure differential into cavities 118 and 119. Scrap pieces 156 and 157 resulting from the holes are pushed into cavities 118 and 119 when plugs 138 and 139 retract. Because of the tapering of cavities 118 and 119, scrap pieces 156 and 157 wedge tightly in cavities 118 and 119 (FIG. 8) and act as seals to prevent pressurized fluid 153 from escaping from within member 110 into recesses 122 and 124.

As can be seen from FIG. 8, when holes are punched in accordance with this invention, a radius 159 is formed at the inside edges thereof. Due to the increased ductility of member 110 (in the case of hard materials) caused by the buildup of hydrostatic pressure therein and also because the punching is to the outside rather than into the member, no burrs are left protruding into the member. After the holes have been punched, fluid 153, from within member 110, is allowed to return to its reservoir (not shown). The now punched member 110 is withdrawn from sleeve 114 and backup pressure is again applied to plugs 138 and 139 to cause them to return to the position shown in FIG. 7. This inward movement of plugs 138 and 139 ejects scrap pieces 156 and 157 from the cavities 118 and 119 into the center of sleeve 114, from whence they can be readily removed.

Third embodiment

Another alternative method of practicing the invention may be illustrated in connection with the apparatus shown in FIG. 9. In this alternative method, the step of removing scrap pieces 156 and 157 from sleeve 114 (FIG. 8) is eliminated.

Figure 9:
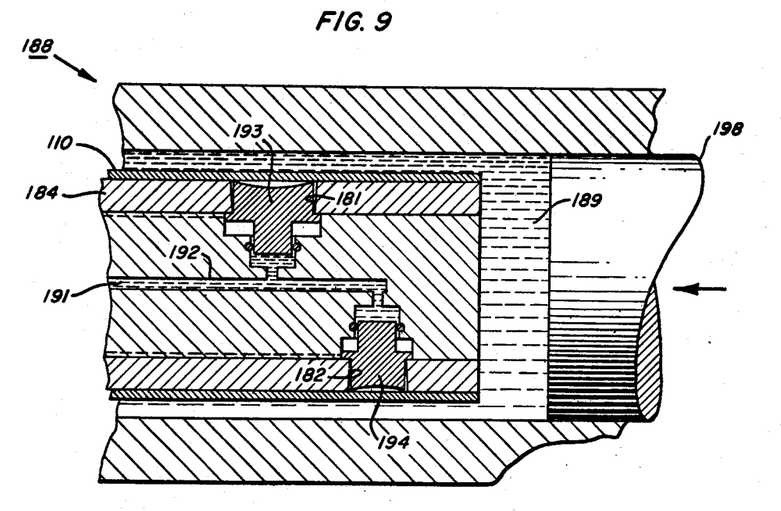
FIG. 9 is a partially sectioned schematic view of a tubular member being cut at a plurality of points in accordance with another method illustrating the principles of the invention.

The embodiment of FIG. 9 functions in substantially the same manner as that of FIGS. 7 and 8 with the exception that scrap pieces 156 and 157 are removed from die block 111 with member 110. To accomplish the foregoing, die cavities 181 and 182, into which the material being cut is to be sheared, are formed in a mandrel 184. Mandrel 184 substantially corresponds in cross-sectional area to the internal dimensions of member 110. After insertion of mandrel 184 into member 110, the combination is placed into a pressure vessel 188 which is then filled with a working fluid 189, such as silicone oil. It should be noted that the entire member 110 to be perforated is placed in working fluid 189 in order to prevent pinching of member 110 where it enters pressure vessel 188.

A pressurized fluid 191 is then supplied to die cavities 181 and 182 through a fluid supply passageway 192 in mandrel 184. Pressurized fluid 191 causes plugs 193 and 194, which are respectively located in die cavities 181 and 182, to be urged against the internal walls of member 110. Although it appears that pistons on plugs 193 and 194 in FIG. 9 are equal in cross-sectional area, the pistons are in fact of different cross-sectional areas in order to achieve the equalization of resistances to hydraulic cutting action offered by the areas opposite plugs 193 and 194.

Fluid 189 within pressure vessel 188 is then pressurized by inward movement of a ram 198 and the operation proceeds as described above in relation to FIGS. 7 and 8. That is, the pressure applied to the walls of member 110, in this case the external walls, is allowed to build up until it is sufficient to cause shearing of all the holes to be formed.

When a sufficiently high external pressure has been achieved, the pressure differential across plugs 193 and 194 becomes sufficiently great to cause retraction of the plugs, and holes corresponding in size and shape to die cavities 181 and 182 are simultaneously cut. When shearing occurs, the scrap pieces are forced into cavities 181 and 182 in mandrel 184. When mandrel 184 and member 110 are withdrawn from pressure vessel 188, the scrap pieces are removed with it.

While the foregoing illustrative embodiments of this invention have been shown and described, various modifications and substitutions may be made without deviating from the spirit and scope of this invention. For example, while pistons 146 and 148 within cavities 118 and 119 (FIG. 7) have been shown as being hydraulically actuated, they may alternatively be spring loaded. Also, while "slow" cutting has been discussed, rapid cutting is suitable for many applications. Rapid cutting may be accomplished by simply relieving the backup pressure applied to plugs 138 and 139 (or 193 and 194) when the working fluid is sufficiently pressurized. Such pressure relief may be accomplished by valving cylinders 134 and 136.

While discussed in connection with cutting rectangular tubular members, the principles of the invention may be employed for cutting circular or other cross-sections. With only slight tooling modification, the invention may be employed for cutting a plurality of holes in a flat blank or other non-tubular workpiece. In addition, holes of any configuration can be simultaneously cut from the member. Further, while the achieving of plastic flow in accordance with Bridgmans' principles is desirable, for soft and thin workpieces it is not necessary that the work be subjected to a fluid pressurized to the degree necessary to produce an increase in ductility. On the other hand, when cutting holes in normally brittle materials, it is desirable that the fluid be highly pressurized such that the brittle-to-ductile transition pressure for the material is exceeded.

It is to be understood that the above-described embodiments of practicing the methods of the invention are merely illustrative of its principles, and that other embodiments may be devised without departing from the scope thereof.

What is claimed is:

1. A method of severing members having portions which have differing resistances to the same hydraulic cutting action, comprising the steps of:
   placing said portions between the cavity of a female die and a source of hydraulic pressure opposite the cavity,
   applying increasing hydraulic pressure to the portions to be severed, and
   supporting said portions so as to substantially equalize their resistances to hydraulic cutting action and until sufficient hydraulic pressure is applied to insure simultaneous cutting of all of the portions to be severed.

2. The method of severing members according to claim 1, wherein the portions of the member to be severed are supported with differing forces so that these portions offer substantially the same resistance to hydraulic cutting action and cutting occurs substantially simultaneously at all such portions.

3. A method of hydraulically cutting a tubular member, the wall portions of which offer different degrees of resistance to hydraulic cutting action, which comprises the steps of:
   placing the tubular member between the cavity of a female die and a source of hydraulic pressure opposite the cavity;
   applying increasing hydraulic pressure to at least the portions of the tubular member to be severed; and
   supporting the portions of the tubular member to be severed from within the cavity, the support force at a particular portion being at least as great as the difference between the force necessary to sever the portion most resistant to hydraulic cutting and that necessary to sever the particular portion, thereby causing the applied hydraulic pressure to simultaneously cut all portions of the tubular member to be severed when this support force is exceeded.

4. The method of severing a tubular member having portions which offer different resistance to shearing, which comprises the steps of:
   positioning a tubular member in a die having a cavity therein which circumscribes the member;
   supporting the walls of the tubular member from within the die cavity with differing forces in accordance to the cutting resistance of such portions;
   confining a fluid within the tubular member, the confined fluid contacting the walls of the member opposite to the die cavity; and
   pressurizing the confined fluid until the forces transmitted thereby overcome the supporting forces acting from within the die cavity, whereupon all of the wall portions of the member in registration with the die cavity simultaneously shear into the cavity.

5. The method of severing tubular members accoding to claim 4, wherein the confined fluid is pressurized sufficiently to render the portions of the tubular member opposite the die cavity increasingly ductile.

6. In a method of severing tubular members which have portions exhibiting non-uniform resistance to hydraulic shearing action, the steps of:
   positioning a tubular member within the cavity of a female die so that a longitudinal section of the exterior of the member is circumscribed by the die cavity;
   supporting the areas to be severed of the member from within the cavity with forces in accordance to the cutting resistance of such portions such that one area is not sheared before another area;
   introducing a fluid into a confined area within the member opposite the supporting force; and
   pressurizing the fluid such that the forces transmitted thereby on the tubular member are sufficient to overcome the supporting forces acting from within the cavity, whereupon all of the portions to be severed are simultaneously sheared into the cavity.

7. The method of severing tubular members according to claim 6, wherein the fluid is pressurized sufficiently great to render the portion of the tubular member opposite the die cavity increasingly ductile.

8. A method of simultaneously cutting a plurality of holes in normally rigid members, wherein the areas of the member to be cut exhibit differing resistances to hydraulic cutting action, comprising the steps of:
   placing a member between a die having a plurality of die cavities formed therein and a source of hydraulic pressure opposite the cavities;
   supporting the member from within the respective die cavities with forces which substantially equalize the resistances to hydraulic cutting action exhibited by the respective areas to be cut; and
   applying increasing hydraulic pressure to the areas of the member opposite the die cavities to simultaneously overcome the equalized resistances to hydraulic cutting action, so that all of the areas are substantially simultaneously cut.

9. The method of simultaneously cutting a plurality of holes in normally rigid members according to claim 8, wherein the member is supported from within the cavities with forces inversely related to the resistance to hydraulic cutting action of the respective areas opposite the cavities.

10. The method of simultaneously cutting a plurality of holes in normally rigid members according to claim 8, wherein the member is supported from within each die cavity with a force directly related to the cross-sectional area of that cavity.

11. The method of simultaneously cutting a plurality of holes in a normally rigid member according to claim 8, wherein the applied increasing hydraulic pressure is increased sufficiently to render at least the portion of the member opposite the die cavities increasingly ductile.

12. A method of producing a plurality of holes in a workpiece, wherein the areas of the material from which the holes are to be cut offer different resistances to hydraulic cutting action, which comprises:

placing the workpiece between a die having a plurality of die cavities therein, corresponding to the holes to be produced in the workpiece, and a source of pressurized hydraulic fluid;

increasing the pressure applied by the hydraulic fluid to the workpiece; and supporting the areas of the material to be cut from the workpiece against the action of the hydraulic fluid with forces inversely related to the resistances to hydraulic cutting action of such areas to insure substantially simultaneous production of the plurality of holes by action of the hydraulic fluid.

13. A method of simultaneously cutting a plurality of holes of different sizes in a tubular member, which comprises the steps of:

positioning a tubular member, in which it is desired to simultaneously cut a plurality of different sized holes, within a die having a plurality of die cavities formed therein, the die cavities corresponding in size and shape to the holes to be cut;

supporting the member from within the die cavities with forces inversely related to the resistances to hydraulic cutting action exhibited by the areas opposite the cavities;

confining a fluid within the member such that the fluid contacts the areas of the member opposite the die cavities; and pressurizing the confined fluid until sufficient pressure is exerted on the member to overcome simultaneously the support forces acting from within the die cavities, so that all of the areas of the member in registration with the die cavities are cut simultaneously into the die cavities.

14. The method according to claim 13, wherein the confined fluid is pressurized sufficiently to render the portions of the tubular member opposite the die cavities increasingly ductile.

15. A method of simultaneously cutting a plurality of holes in a tubular member, which comprises the steps of:

positioning a tubular member over a mandrel having a plurality of die cavities formed therein; the die cavities corresponding in size and shape to the holes to be cut;

placing the member with the mandrel therein into a pressure vessel;

internally supporting the member from within the die cavities with forces inversely related to the resistances to hydraulic cutting action exhibited by the respective areas opposite the cavities;

admiting a fluid to the pressure vessel such that the fluid surrounds the member within the vesel; and pressurizing the fluid within the vesel until sufficient pressure is exerted on the member to overcome simultaneously the support forces acting from within the die cavities, such that all of the areas of the member in registration with the die cavities simultaneously are cut into the die cavities.

16. A method of cutting members having various portions which have differing resistances to cutting, and which members increase in ductility when subjected to sufficiently highly pressurized fluids, comprising the steps of:

placing portions of the member to be cut between the cavity of a female die and a source of hydraulic pressure opposite the cavity;

applying increasing hydraulic pressure to the portions to be cut; and supporting the portions of the member to be cut with forces in accordance to the cutting resistance of such portions until sufficiently high hydraulic pressure is applied to cause said member portions to increase in ductility;

while maintaining said support, applying cutting force, to said member portions to be cut, sufficiently great to cut the member portion of maximum resistance to cutting; and relieving the support of the member portions to be cut.

17. A method of severing members having portions which have differing resistances to hydraulic cutting action, and which members increase in ductility when subjected to pressurized fluids, comprising the steps of:

placing portions of the member to be severed between the cavity of a female die and a source of hydraulic pressure opposite the cavity;

applying increasing hydraulic pressure to the portions to be severed; and supporting the portions of the member against the action of the hydraulic pressure with forces in accordance to the cutting resistance of such portions until sufficient hydraulic pressure is applied to cause said member to increase in ductility and to insure simultaneously cutting of all of the portions to be severed.

18. A method of simultaneously cutting a plurality of holes in normally rigid members, wherein the portions of the member to be cut exhibit differing resistances to hydraulic cutting action, and wherein such normally rigid members increase in ductility when sufficiently high hydraulic pressure is applied thereto, comprising the steps of:

placing a member between a die having a plurality of die cavities formed therein and a source of hydraulic pressure opposite the cavities;

supporting the member from within the respective die cavities with forces which substantially equalize the resistances to hydraulic cutting action exhibited by the respective portions to be cut; and applying increasing hydraulic pressure to portions of the member opposite the die cavities, said hydraulic pressure being increased sufficiently to cause said portions to increase in ductility and to simultaneously overcome the equalized resistances to hydraulic cutting action, so that all of the portions are substantially simultaneously cut.

19. A method of simultaneously shearing different portions of a member which have differing resistances to shear, and which member increases in ductility when high hydrostatic pressure is created therein; comprising the steps of:

placing said different portions to be sheared between the cavity of a female die and a source of hydraulic pressure opposite the cavity;

applying increasing hydraulic pressure to said different portions to be sheared;

supporting said different portions against the shearing action of said hydraulic pressure so as to substantially equalize the resistances to shear of said different portions and until said hydraulic pressure is increased sufficiently to create high hydrostatic pressure in said member and increase the ductility thereof, and until said hydraulic pressure is increased sufficiently to shear the portion of said member having the maximum resistance to shear.

References Cited

UNITED STATES PATENTS 2,298,132  10/1942  Johnson _________ 83—53 X
2,395,123  2/1946   Hutt ____________ 83—53
2,732,897  1/1956   Musser __________ 83—177

ANDREW R. JUHASZ, Primary Examiner

JAMES F. COAN, Assistant Examiner

U.S. Cl. X.R.

72—55; 83—54, 177, 178

L-566-PT
(6-69)

UNITED STATES PATENT OFFICE
CERTIFICATE OF CORRECTION

Patent No. 3,495,486      Dated February 17, 1970

Inventor(s) Francis Joseph Fuchs, Jr.

It is certified that error appears in the above-identified patent and that said Letters Patent are hereby corrected as shown below:

In the specification, Column 3, line 22, "serving" should have been --severing--. Column 8, line 22, "Locked" should have been --Looked--; lines 48 and 49, "resective" should have been --respective--. Column 9, line 75, "resistance" should have been --resistances--.

In the claims, Column 12, line 28, after "cavity" insert a comma --,--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents